United States Patent Office 2,831,767
Patented Apr. 22, 1958

2,831,767

WATER-DISPERSIBLE PROTEIN POLYMER COMPOSITIONS AND SILVER HALIDE EMULSIONS CONTAINING SAME

John R. Dann, Bernard D. Illingsworth, and John W. Gates, Jr., Rochester, N. Y., assignors to Eastman Kodak Company, Rochester, N. Y., a corporation of New Jersey No Drawing. Application April 29, 1954
Serial No. 426,552

2 Claims. (Cl. 96—114)

This invention relates to aqueous polymeric solutions prepared by the polymerization in aqueous medium of a protein or a saturated acyl derivative of protein with a single unsaturated polymerizable monomer, and to compositions including mixtures of such polymers with proteins.

Gelatin and similar proteins are employed extensively in the manufacture of photographic products and similar materials wherein a colloidal emulsion is desired. Various attempts have been made to replace a part or all of the gelatin with various materials for use in coating on film base or other film supports such as glass or paper. In many cases, mixtures of such materials with gelatin have been unsatisfactory because of the optical and mechanical incompatibility of the added material with the gelatin and a consequent haziness of the dried material or coagulation of the emulsion. As a general rule, most of the water-soluble polymers are either incompatible with gelatin at some stage of the coating operation, or they do not possess properties comparable to the gelatin to the desired extent.

In the manufacture of photographic products, it has been necessary to employ especially pure grades of gelatin in order to obtain satisfactory results. As a consequence, the use of many of the proteins available commercially was limited in the manufacture of photographic products. For example, lower grades of gelatin, glue, casein, and the like could not be readily employed, and hence the cost of making photographic emulsions was relatively high.

It is accordingly an object of this invention to provide certain new and improved aqueous polymeric solutions which are capable of forming layers having good mechanical and optical properties either alone or in admixture with gelatin.

It is another object of this invention to prepare polymeric material by the graft polymerization of a single unsaturated monomer with a protein or an acylated protein derivative to give products which form aqueous solutions which can be used directly in the manufacture of photographic emulsions, and which give dried films which are water soluble but which possess the requisite degree of flexibility and elasticity, and which can be hardened with formaldehyde and similar gelatin hardeners when admixed with gelatin or in some cases when used alone.

Another object of the invention is to provide aqueous polymeric solutions which can be mixed with gelatin over a wide range of proportions without causing haziness of the dried material or coagulation during the coating operation, and which are effective as extenders in the dried gelatin layer without appreciably affecting the refractive index of the gelatin.

Another object of the invention is to prepare water-soluble two-component graft polymers by the polymerization of a vinylic or diolefinic polymerizable monomer with an unsubstituted protein or a saturated acyl protein derivative.

Other objects will be apparent from the description and claims which follow.

These and other objects of the invention are attained by preparing water-soluble polymeric material consisting of 60–100% by weight of combined hydrophilic material and 0–40% by weight of combined hydrophobic material by polymerizing a mixture consisting of saturated protein material and a single polymerizable monomer containing a —CH=C< group, the hydrophilic material including the saturated protein material in an amount of from 5% to 95% by weight of the mixture, the monomer amounting to at least 5% by weight of the mixture. The saturated protein material can be either an unsubstituted protein or a saturated acylated protein and always forms at least 5% by weight of the mixture being polymerized. The monomer can be a hydrophilic monomer, in which case it can amount to 5–95% of the weight of the mixture; or it can be a hydrophobic monomer, in which case it amounts to 5–40% of the weight of the mixture. The polymerization is desirably effected in aqueous medium, whereby the polymeric aqueous solutions thereby obtained are useful over the pH range of 2 to 11 which is ordinarily encountered in the manufacture of photographic materials. The products are compatible with conventional photographic gelatins and with degraded gelatins to give mixtures which will produce clear flexible coatings suitable for use in the photographic art.

The polymer dispersions of this invention can be used directly for the preparation of films, and the dried films prepared from such dispersions are normally water soluble and can be readily redispersed in hot water. The films prepared from unsubstituted protein copolymers can be hardened by treatment with formaldehyde and similar gelatin hardeners and hence can be readily employed as a substitute for photographic gelatin or as an additive for photographic gelatin. The hardness, flexibility, elasticity and similar properties can be controlled over a rather wide range by a suitable choice of the protein component, and particularly of the polymerizable unsaturated monomer. Although the polymers prepared from saturated acylated proteins are not hardened directly by formaldehyde, mixtures of such polymers with gelatin can be hardened in this way.

The polymers which are prepared in accordance with this invention are actual chemical combinations of the protein component and the polymerizable monomer, and are probably formed by a type of graft polymerization between the growing polymer chains and the protein molecule. They must, therefore, be distinguished from the mere physical mixtures of protein and polymers which have been employed heretofore. The exact nature of the polymeric material of the invention is not readily defined. However, as can be seen from the following considerations, the polymers exhibit a unitary character quite unlike the characteristics of mixtures. Thus, for example, graft polymers of glue and acrylonitrile prepared in accordance with this invention are soluble in warm water but not in cold water. Accordingly, dry films of this polymeric product and of the corresponding polyacrylonitrile-glue mixture were prepared on glass plate supports and were soaked in water at room temperature for one hour, dried and weighed. The acrylonitrile-glue graft polymer of this invention lost only 27.8% of its original weight, whereas the mixture of the polyacrylonitrile and glue lost 96.5% of its original weight under the same conditions. Other evidence of the unitary nature of the products of this invention is shown by the fact that graft polymers of acrylic acid and gelatin or acrylic acid and glue coagulate when acidified. The corresponding mixtures of the components which have not been graft polymerized show no tendency toward coagulating when acidified. Also, an aqueous mixture containing 70 parts of gelatin and 30 parts of polyvinyl pyridine hydrochloride on standing at room temperature separates into two layers, whereas the graft polymer of this invention prepared by polymerizing the components together to give the same percentage composition as in the mixture does not separate on standing. Other characteristics of the polymers also show differences over mere mixtures of the components. The polymers of the invention are soluble or miscible in water in the same way as is gelatin and show no discrete polymer particles usually in dry films when examined under the electron microscope.

The polymers of the invention consist of at least 60% by weight of combined hydrophilic material which can be either the saturated protein material alone if a hydrophobic monomer is used, or the saturated protein material and the monomer when a hydrophilic monomer is used. In the latter case, of course, the entire polymer is composed of hydrophilic material since only a single monomer is used in practicing this invention. In both cases, the saturated protein material amounts to at least 5% of the combined dry weight of protein material and monomer. Acrylic acid, acrylamides and vinyl pyridines are typical hydrophilic monomers, the characteristics of these and similar monomers being well known in the art.

The saturated protein component which is employed in preparing the polymeric dispersions of this invention can be an unsubstituted protein such as hydrolyzed gelatin or glue, casein, soybean protein, or the like, or it can be an acylated protein such as succinyl protein, phthalyl protein, or acetyl protein prepared by reacting an organic acid anhydride or chloride with a protein such as glue, gelatin, casein, or the like. Such acylated protein derivatives are known to the art, and the preparation of a phthalic anhydride derivative of gelatin suitable for use in practicing the invention is described in Yutzy and Frame, U. S. Patent No. 2,525,753. Other protein derivatives can be prepared in similar fashion by reacting any of the well known proteins with any of the saturated organic acid anhydrides. Thus, for example, a method of preparing derivatives of other proteins than gelatin is described in the copending application of Lowe and Gates, Serial No. 768,480, now Patent No. 2,691,582. Since such unsubstituted proteins and saturated acyl protein derivatives are well known in the art, and such proteins and protein derivatives are all suitable for use in practicing this invention, it is not intended that this invention shall be limited to the particular materials described herein with reference to certain preferred embodiments of the invention. One advantage of this invention resides in the fact that the protein which can be employed need not be in a highly purified state such as was necessary with photographic gelatin alone. Thus, lower grades of gelatin, glue, casein, or the like can be satisfactorily employed in practicing the invention since the graft polymers obtained therefrom do not adversely affect photographic emulsions.

The polymerizable monomer which is graft polymerized with the protein or acyl protein derivative can be any of the well known olefinic polymerizable monomers, including the vinylic monomers and the diolefinic monomers. Thus, for example, the vinylic monomers can include styrene or substituted styrenes, acrylic acid esters, methacrylic acid esters, vinyl ethers, vinyl ketones, vinylidene chloride, vinyl chloride, vinyl esters, acrylonitrile, substituted acrylonitriles, vinyl pyridines, acrylamides, allylamines, and similar well known vinylic monomers. Similarly, the polymerizable diolefins such as 1,3-butadiene, isoprene, chloroprene, 2,3-dimethyl-1,3-butadiene and similar diolefinic monomers are entirely suitable for use in practicing the invention.

Typical monomers which can be employed in practicing the invention include ethyl acrylate, n-propyl acrylate, isopropyl acrylate, isobutyl acrylate, n-amyl acrylate, isoamyl acrylate, n-hexyl acrylate, 2-ethylhexyl acrylate, n-octyl acrylate, n-decyl acrylate, β-cyanoethyl acrylate, β-chloroethyl acrylate, n-butyl acrylate, 2-methoxyethyl acrylate, 2-ethoxyethyl acrylate, 2-butoxyethyl acrylate, and similar alkyl acrylates wherein the alkyl group contains from 1 to 10 carbon atoms; methacrylates containing from 1 to 10 carbon atoms, and preferably from 4 to 10 carbon atoms in the alkyl group, such as n-butyl methacrylate, n-hexyl methacrylate, 2-ethylhexyl methacrylate, n-octyl methacrylate, ethyl methacrylate, methyl methacrylate and the like; styrene monomers such as styrene or a substituted styrene such as o-methyl styrene, m-methyl styrene, p-methyl styrene, 2,4-dimethyl styrene, 2,5-dimethyl styrene, 3,4-dimethyl styrene, 3,5-dimethyl styrene, 2,4,5-trimethyl styrene, 2,4,6-trimethyl styrene, 2,4,5-triethylstyrene, o-ethylstyrene, m-ethylstyrene, p-ethylstyrene, 3,5-diethyl styrene, p-n-butyl styrene, m-sec-butyl styrene, m-tert.-butyl styrene, p-hexyl styrene, p-n-heptyl styrene, p-2-ethylhexyl styrene, o-fluoro styrene, m-fluoro styrene, p-fluoro styrene, o-chloro styrene, m-chloro styrene, p-chloro styrene, 2,3-dichloro styrene, 2,4-dichloro styrene, 2,5-dichloro styrene, 2,6-dichloro styrene, 3,4-dichloro styrene, 3,5-dichloro styrene, 2,3,4,5,6-pentachloro styrene, m-trifluoromethyl styrene, o-cyano styrene, m-cyano styrene, m-nitro styrene, p-nitro styrene, p-dimethyl amino styrene, and similar styrene derivatives; acrylonitrile monomers such as acrylonitrile or a substituted acrylonitrile such as methacrylonitrile, α-chloroacrylonitrile, α-bromoacrylonitrile, trifluoromethyl acrylonitrile, α-trifluoromethylcarboxy acrylonitrile, and the like; vinyl esters such as vinyl acetate, vinyl propionate, vinyl butyrate, or the like; vinyl pyridines such as 4-vinyl pyridine, 2-methyl-5-vinyl pyridine and the like; vinyl ketones such as methylvinyl ketone, ethylvinyl ketone, and the like; vinyl ethers such as methylvinyl ether and the like; alkenyl esters such as isopropenyl acetate and the like, and similar well known polymerizable unsaturated monomers such as acrylic acid, allylamine, acrylamide, methacrylamide, N-alkyl acrylamides such as N-methyl acrylamide and N-methyl methacrylamide and the like.

The polymeric solutions of this invention are prepared by solution polymerization in an aqueous system with or without a micell-forming surface-active agent. The use of a surface-active agent facilitates the dispersion of the monomer in the water. The surface-active agents which can be employed in practicing the invention include the cationic surfactants, anionic surfactants, and amphoteric surfactants. Such surface-active materials which form micells are well known in the art, and it is not intended that the invention shall be limited to the particular surfactants which are particularly described herein. Any of the other micell-forming surface-active agents can be employed in practicing the invention with advantageous results. Typical surfactants which can be employed in practicing the invention are the salts of the higher fatty acids such as sodium stearate, potassium stearate, sodium palmitate, potassium palmitate, sodium laurate, potassium laurate, sodium myristate, potassium myristate, and the like; salts of higher fatty alcohol sulfates such as the sodium or potassium lauryl sulfates, sodium or potassium di-(2-ethylhexyl) sulfosuccinates, sodium or potassium cetyl sulfates, sodium or potassium stearyl sulfates, and the like; salts of aromatic sulfonic acids such as the sodium or potassium salts of an alkyl naphthalene sulfonic acid; high molecular weight quaternary ammonium salts containing the radical $C_{15}H_{31}$ or $C_{17}H_{35}$; and similar well known micell-forming surface-active agents.

The polymerization in accordance with this invention is facilitated by the use of a polymerization catalyst. Such polymerization catalysts are well known in the art, and any of the well known catalytic materials or combinations such as are commonly employed in promoting solution polymerizations can be used. Thus, for example, the per-catalysts are entirely suitable, including the organic peroxides such as benzoyl peroxide, acetyl peroxide, lauroyl peroxide, tert. butyl hydroperoxide, and hydrogen peroxide; persulfates such as sodium, potassium or ammonium persulfates, or persulfuric acid itself; perborates such as sodium or potassium perborates; water-soluble salts or percarbonic acid; water-soluble salts of perphosphoric acid; water-soluble salts of sulfo-peracid; and similar well known per-catalysts. If desired, the redox-type catalysts can be used in practicing the invention, and in some cases this may be desirable in order to carry out the reaction at a lower temperature or in a shorter time than can be obtained using an oxygenated catalyst alone.

The polymerization in accordance with this invention is desirably effected at an elevated temperature. Usually, a temperature of about 80° C. is satisfactory since the polymerization ordinarily occurs within a period of about one hour at this temperature. It will be understood, however, that higher or lower temperatures can be employed in accordance with well known polymerization practice. The polymerization time will, of course, depend upon the other variable factors such as the kind and concentration of catalyst, the temperature of polymerization, the nature of the polymerizing reactants, and similar variable factors. When the polymerization is effected at an elevated temperature it may be necessary to effect the polymerization in a reaction system provided with a reflux condenser or in a closed pressure system. Such expedients are well known in the art and do not form a limiting part of the present invention.

When practicing the invention, the protein or saturated protein derivative is employed in an amount of from 5 to 95% by weight of the mixture. Polymers prepared using such amounts of protein component are readily soluble in warm water and can be redispersed from the dried film of polymer. Furthermore, it is possible to dry the polymeric dispersions prepared in accordance with this invention and store them for prolonged periods of time in the dried form. The dried polymers can thereafter be readily redispersed in warm water and used in emulsion applications in the same manner as the original aqueous dispersion. Because of its inherent water solubility, the polymer need not be mixed with gelatin prior to the drying. The protein component is unsubstituted or acylated protein such as gelatin, hydrolyzed gelatin, glue, casein, or soy protein of either low or high grade. The casein is particularly useful when it has first been modified by treating it in solution with hydrogen peroxide at an alkaline pH and at an elevated temperature to cause some oxidation. The protein can be completely unmodified, however, and such unmodified proteins give entirely satisfactory results. Any of the acyl protein derivatives can be employed provided such derivatives do not include an ethylenic unsaturation which would cause the derivative to enter into a copolymer reaction with the monomer rather than the graft polymerization which is desirably effected in accordance with this invention.

The dispersions which are prepared by the process of this invention can be mixed directly with aqueous solutions of gelatin or a similar naturally occurring hydrophilic colloidal protein which has been rendered soluble or dispersible in water. The dispersions of the invention are compatible with protein in all proportions, and they can be used alone or with varying amounts of another protein such as from 5 to 95% by weight of gelatin or other protein material. The coatings which are obtained from the compositions of this invention when used either alone or in admixture with gelatin or the like have good flexibility and good optical clarity. When the compositions are thereby employed in the manufacture of photographic materials, the mixtures of the dispersion and the gelatin are desirably adjusted to a pH value of 2–11 and preferably from 4.5 to 7 during the mixing. Some of the polymers coagulate at an acid pH and redisperse under alkaline conditions. The properties of the dried film can be varied over a considerable range by a suitable choice of the polymerizable monomer. Generally speaking, the alkyl acrylates containing from 2 to 10 carbon atoms in the alkyl group, the alkyl methacrylates containing from 4 to 10 carbon atoms in the alkyl group, and the diolefins such as butadiene, isoprene, chloroprene, and the like give polymers having somewhat higher flexibility. The other monomers such as styrene, substituted styrenes, acrylonitrile, substituted acrylonitriles, methyl acrylate, methyl or ethyl methacrylate, vinyl acetate, vinylidene chloride, isopropenyl acetate, and the like give polymers having a lower degree of flexibility but greater film strength.

The compositions prepared in accordance with this invention can be employed for coatings on any of the well known film support materials using any of the conventional procedures for obtaining such coatings. Thus, for example, the polymeric dispersions can be employed in coating polyester-type films, cellulose triester films, and similar film base materials as well as glass plates and paper bases. The polymeric dispersions can be prepared either batchwise or in continuous fashion and can be used in the manufacture of either black-and-white or color photographic film. They can be used in the subbing layers of film or in one or more of the emulsion layers, including the emulsions carrying photosensitive materials such as the silver halides. The compositions may be employed directly without further addition, or they can be employed with dyes to provide backing layers, pigments such as barium sulfate to provide baryta coatings, or photosensitive silver halides to provide photosensitive emulsions. The solution polymers of the invention can advantageously be used in color emulsions containing incorporated couplers as well as those developed in a coupled diffusion process. The unsubstituted protein polymers, when hardened with formaldehyde, become water-insoluble, or they can be used without hardening to give readily dispersible layers which are soluble in warm water. Any of the polymers can be hardened when mixed with gelatin.

The invention is illustrated by the following examples of certain preferred embodiments thereof. It will be understood that the examples are included merely for purposes of illustration, and that the invention is not limited thereby unless otherwise specifically indicated.

*Example 1*

To a rapidly stirred solution of 0.44 gram of potassium persulfate in 134 ml. of water at 85° C. is added a solution of 13.8 grams of acrylamide and 13.8 grams of gelatin in 116 ml. of water. The reaction mixture is held at 85° C. for 1 hour and then cooled. The resulting product is a clear solution.

*Example 2*

To a stirred solution of 0.35 gram of potassium persulfate and 16.7 grams of acrylamide in 150 ml. of water at 85° C. is added a solution of 11.1 grams of 7% phthalyl gelatin in 100 ml. of water. The reaction mixture is held at 85° C. for 15 minutes. The product is a clear, viscous solution miscible with water and gelatin solutions.

*Example 3*

To a stirred solution of 0.35 gram of potassium persulfate and 11.1 grams of acrylamide in 150 ml. of water is added a solution of 16.7 grams of 7% phthalyl gelatin in 100 ml. of water. The reaction mixture is held at 85° C. for one-half hour. The product is a clear solution that sets to a stiff gel on cooling.

*Example 4*

To a stirred solution of 0.32 gram of potassium persulfate in 143 ml. held at 85° C. is added over a period of 5 minutes a solution of 17.5 grams of 5% succinyl glue in 81 cc. of water along with 7.5 grams of methyl acrylate. The temperature of the reaction mixture is held at 85° C. for 30 minutes longer. The product is a slightly hazy dispersion which can be dried to a clear film redispersible in water.

*Example 5*

To a stirred solution of 2.22 grams of sodium lauryl sulfate and 2.45 grams of potassium persulfate in 717 ml. of water at 85° C. is added a solution of 77 grams of glue in 360 ml. of water along with 33 grams of n-butyl acrylate over a 5-minute period. Heating at 85° C. is continued for one-half hour longer. The product is a hazy dispersion that can be dried to flexible film.

*Example 6*

To a stirred solution of 2.22 grams of sodium lauryl sulfate and 2.45 grams of potassium persulfate in 717 ml. of water at 85° C. is added a solution of 77 grams of glue in 360 ml. of water together with 33 grams of styrene over a 5-minute period. The mixture is heated for one-half hour at 85° C. following the addition. The product which is obtained has a similar appearance to that of the preceding example but dries to a film which is considerably less flexible than that obtained using n-butyl acrylate as the monomer.

*Example 7*

Similar results were obtained using acrylonitrile in place of styrene in the process of the preceding example. The product was not as hazy as that of Examples 5 and 6. Dry films of the polymeric product obtained according to this example dispersed readily in warm water.

*Example 8*

A stirred solution of 15 grams of acrylamide, 10 grams of glue, and 0.32 gram of potassium persulfate in 250 ml. of water is heated at 85° C. for 20 minutes. The resulting product is a clear, viscous solution that can be dried to a clear film redispersible in water.

*Example 9*

A stirred solution of 15 grams of acrylic acid, 10 grams of gelatin, and 0.32 gram of potassium persulfate in 250 ml. of water is heated on a steam bath at 85° C. for one-half hour. As the clear solution starts to cool, it becomes cloudy. Alkali is added until a pH of 5.0 is reached at which point a clear, viscous solution is obtained. Addition of acid to a pH of 3.5–4.0 will coagulate this material. The coagulum will redisperse on addition of alkali and the resulting solution can be chilled to a stiff gel, sliced, washed in cold water, and dried in a manner similar to gelatin solutions. The dried material on plumping in water and warming will redisperse.

*Example 10*

Similar results were obtained employing the process of the preceding example using 10 grams of acrylic acid and 10 grams of gelatin as the reacting components. The resulting polymeric dispersion showed characteristics similar to those obtained in the preceding example. The acrylic acid-gelatin polymers prepared in accordance with this invention find excellent utility as peptizers in photographic emulsions because of their ability to be coagulated under acid conditions and to again disperse under alkaline conditions.

*Example 11*

A stirred solution of 15 grams of acrylic acid, 35 grams of gelatin, and 0.80 gram of potassium persulfate in 284 ml. of water is heated on the steam bath at 85° C. for one-half hour. As the clear solution starts to cool, it becomes cloudy, whereupon alkali is added to give a pH of 5.0. At this pH, a clear, viscous solution is obtained which will coagulate if acidified to a pH of 3.5 to 4.0. The coagulum thus obtained will redisperse on the addition of alkali, and the resulting solution can be chilled to a stiff gel, sliced, washed in cold water, and dried in a manner similar to gelatin solutions. The dried material can be readily redispersed in warm water. The yield of dry product is 47 grams.

*Example 12*

A solution of 40 grams of gelatin and 0.80 gram of potassium persulfate in 450 ml. of water is adjusted to pH of 3.5 with 6 N $H_2SO_4$. Then 10 grams of acrylic acid are added and the solution is stirred and heated on a steam bath at 85° C. for 15 minutes. The material is handled in a manner similar to that in Examples 9, 10 and 11. The yield of dry product is 49 grams.

*Example 13*

A solution of 25 grams of 4-vinyl pyridine in 100 ml. of dilute hydrochloric acid (pH 4.0) is added to a stirred solution of 25 grams of gelatin and 0.80 g. of potassium persulfate in 250 ml. of water, and the mixture is then heated at 85° C. for 20 minutes. The resulting product is a clear solution which sets to a gel on chilling.

*Example 14*

A solution of 25 grams of gelatin and 0.80 gram of potassium persulfate in 450 ml. of water is adjusted to a pH of 3.5 with dilute sulfuric acid. Thereafter 5 grams of 4-vinyl pyridine are added, and the solution is stirred and heated on a steam bath at 85° C. for 15 minutes. The product thus obtained forms a clear solution at a pH of 5.0 or higher and can be coagulated in the pH range of 3.5 to 4.0.

*Example 15*

A solution of 85 grams of gelatin in 900 ml. of water is adjusted to pH 3.0 with 6 N sulfuric acid. Then 1.60 grams of potassium persulfate and 15 grams of acrylic acid are added and the resulting solution is stirred and heated at 85° C. for 15 minutes. As the solution cools, the polymeric material begins to separate and the solution becomes cloudy. Addition of 5 N sodium hydroxide to pH 5.0 redissolves the material and the solution is again clear. This solution can be chill-set to a stiff gelatin, shredded, washed and dried in the manner conventional to gelatin handling. The dry material can be redissolved by plumping in cold water for one-half hour and then stirring at 40° C.

*Example 16*

A stirred solution of 25 grams of glue, 25 grams of acrylic acid and 0.80 gram of potassium persulfate in 450 ml. of water is heated at 85° C. for 15 minutes. As the solution cools, the polymeric material settles. The supernatant liquid containing excess salts is poured off and replaced with distilled water. The mixture is stirred at 40° C. while 5 N sodium hydroxide is added until a pH of 5.0 is reached at which point the material is again in solution. This solution can be dried to a clear film, which will redissolve on plumping in water and warming.

*Example 17*

A solution of 30 grams of 4-vinyl pyridine in 200 ml. of dilute hydrochloric acid (pH 2.0) is mixed with a solution of 70 grams of gelatin and 1.60 grams of potassium persulfate in 500 ml. of water and the resulting solution is stirred and heated at 85° C. for 20 minutes. The product is chilled, shredded, washed and dried. The yield of dry product is 97 grams. The isoelectric point of this product is 6.8, as compared with 4.9 for the parent gelatin.

Similar results are obtained using other combinations of reactants, including other proteins and other saturated acyl derivatives of proteins with these and similar monomers as described herein. The polymeric dispersions prepared in accordance with this invention can be used in the photographic art in substantially every application in which gelatin has been employed heretofore and find particular utility as gelatin extenders. Thus, for example, the polymeric dispersions can be employed as subbing layers, as protective colloids for photographic emulsions, and as overcoats to protect the film. The polymers can also be used in antihalation backings and in sensitized emulsions.

Although the invention has been described in considerable detail with particular reference to certain preferred

We claim:

1. A mixture of gelatin with a gelatin-compatible aqueous solution of polymeric material which is stable against coagulation at pH values in the range of 4.5–7 and resulting from copolymerization of a mixture of 50–95% by weight of a saturated protein material selected from the group consisting of unsubstituted proteins and acylated proteins, and 95–50% by weight of a single polymerizable monomer from the group consisting of acrylic acid, acrylamide and vinyl pyridine monomers.

2. A silver halide emulsion in gelatin admixed with water-soluble, gelatin-compatible polymeric material resulting from copolymerization of a mixture of 50–95% by weight of a saturated protein material selected from the group consisting of unsubstituted proteins and acylated proteins, and 95–50% by weight of a single polymerizable monomer from the group consisting of acrylic acid, acrylamide and vinyl pyridine monomers.

References Cited in the file of this patent

UNITED STATES PATENTS

| Number | Name | Date |
|---|---|---|
| 1,981,102 | Hagedorn et al. | Nov. 20, 1934 |
| 2,006,002 | Schneider | June 25, 1935 |
| 2,040,033 | Sturken et al. | May 5, 1936 |
| 2,456,295 | Mast | Dec. 14, 1948 |
| 2,460,976 | Church | Feb. 8, 1949 |
| 2,498,792 | Cottet et al. | Feb. 28, 1950 |
| 2,548,520 | Damschroder et al. | Apr. 10, 1951 |
| 2,562,534 | Coffman | July 31, 1951 |
| 2,594,293 | Cowan et al. | Apr. 29, 1952 |